United States Patent
Ergun et al.

(10) Patent No.: US 12,526,009 B2
(45) Date of Patent: Jan. 13, 2026

(54) PHASE LOCKED LOOP WITH DECREASED RECOVERY TIME FROM DISABLING SPREAD SPECTRUM CLOCK

(71) Applicant: QUALCOMM Incorporated, San Diego, CA (US)

(72) Inventors: Burcin Serter Ergun, Poway, CA (US); Julian Puscar, Holly Springs, NC (US); Zhiqin Chen, San Diego, CA (US); Russell Deans, Pittsboro, NC (US); Jyotheeswara Reddy V, Pileru (IN)

(73) Assignee: QUALCOMM INCORPORATED, San Diego, CA (US)

( * ) Notice: Subject to any disclaimer, the term of this patent is extended or adjusted under 35 U.S.C. 154(b) by 138 days.

(21) Appl. No.: 18/661,259

(22) Filed: May 10, 2024

(65) Prior Publication Data

US 2025/0350316 A1 Nov. 13, 2025

(51) Int. Cl.
*H04B 1/7156* (2011.01)
*H04L 7/033* (2006.01)

(52) U.S. Cl.
CPC ......... *H04B 1/7156* (2013.01); *H04L 7/0331* (2013.01)

(58) Field of Classification Search
CPC ........ H04B 1/7156; H04B 2001/71563; H04B 2001/71566; H04B 15/00; H04L 7/0331; H04L 7/033; H04L 7/0338; H04L 7/0337; H04L 7/027; H04L 7/0278; H04L 7/0016; H04L 7/002; H04L 7/0025

See application file for complete search history.

(56) References Cited

U.S. PATENT DOCUMENTS

| | | | | |
|---|---|---|---|---|
| 2008/0074154 | A1* | 3/2008 | Shin | H03B 21/00 327/105 |
| 2008/0231331 | A1* | 9/2008 | Balraj | H03L 7/08 327/145 |
| 2010/0027585 | A1* | 2/2010 | Jeanson | H04B 15/04 375/E1.001 |
| 2011/0068836 | A1* | 3/2011 | Wang | H03L 7/0814 327/141 |
| 2015/0340013 | A1* | 11/2015 | Lee | G09G 5/18 345/213 |

* cited by examiner

*Primary Examiner* — Khanh C Tran
(74) *Attorney, Agent, or Firm* — Loza & Loza, LLP

(57) ABSTRACT

An apparatus, including: a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; and a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency.

20 Claims, 4 Drawing Sheets

PHASE LOCKED LOOP WITH DECREASED RECOVERY TIME FROM DISABLING SPREAD SPECTRUM CLOCK

FIELD

This invention relates to phase locked loops (PLL), and in particular, to a PLL with decreased recovery time from disabling spread spectrum clock (SSC).

BACKGROUND

A phase locked loop (PLL) is used in many data communication systems to provide a relatively frequency-stable clock signal. A clock signal is a substantially periodic signal, which may be used to deliver data in a data communication system at a data rate based on the frequency of the clock signal. The clock signal may have a substantially constant frequency or may be modulated with a spread spectrum clock (SSC) signal. If the clock signal is modulated with the SSC signal, significant reduction in electromagnetic interference (EMI) present in a data communication system may be achieved.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus, includes: a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; and a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency.

Another aspect of the disclosure relates to a method. The method, includes: operating a phase locked loop (PLL) to generate a spread spectrum clock (SSC) clock signal where the SSC clock signal swings between a first frequency and a third frequency based on an SSC enable signal being asserted; operating the PLL to generate a non-SSC clock signal where the non-SSC clock signal is substantially constant at a second frequency based on the SSC enable signal being deasserted; and effectuating a first configuration change of the PLL in response to the SSC enable signal becoming deasserted, the first configuration change reducing a time interval between the SSC enable signal becoming deasserted and the non-SSC clock signal settling to substantially the second frequency.

Another aspect of the disclosure relates to an apparatus. The apparatus, includes: a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency; and a transmit driver configured to generate a data signal with a data rate based on the SSC clock signal or non-SSC clock signal.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" means that the associated parameter may not be exact as indicated but accounts for some variation due to specified tolerances.

Figure 1:
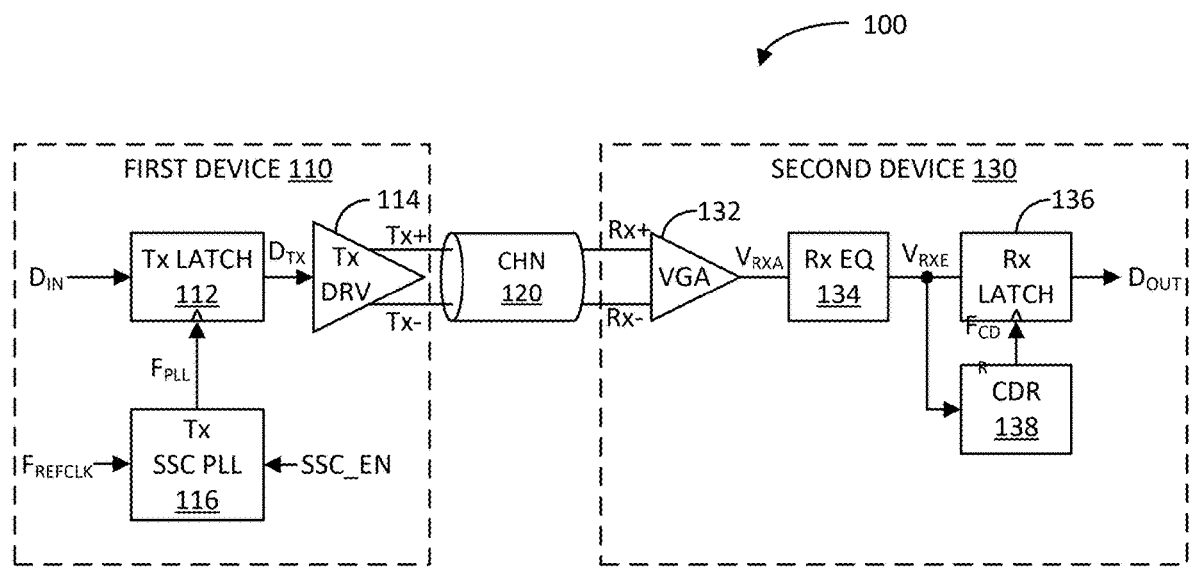
FIG. 1 illustrates a block diagram of an example data communication system in accordance with an aspect of the disclosure.

FIG. 1 illustrates a block diagram of an example data communication system 100 in accordance with an aspect of the disclosure. The data communication system 100 includes a first device 110 coupled to a second device 130 via a channel 120. In this example, the first device 110 is implemented as a data transmitter, and the second device 130 is implemented as a data receiver. However, it shall be understood that the first device 110 may be implemented as a transceiver to also receive data, and the second device 130 may be implemented as a transceiver to also transmit data. The data communication system 100 may be implemented as a Universal Serial Bus (USB) (e.g., USB4 v. 2) data communication system, a Peripheral Component Interconnect Express (PCIe) data communication system, or other type of data communication system.

The first device 110 includes a transmit (Tx) latch 112, a transmit (Tx) driver 114, and a transmit spread spectrum clock phase locked loop (Tx SSC PLL) 116. The Tx latch 112 is configured to receive an input data signal $D_{IN}$ and generate therefrom a transmit data signal $D_{TX}$ having a data rate dictated by a clock signal $F_{PLL}$ generated by the Tx SSC PLL 116.

The Tx SSC PLL 116 is configured to generate the clock signal $F_{PLL}$ based on a reference clock signal $F_{REFCLK}$ and a spread spectrum clock (SSC) enable signal SSC_EN. The Tx SSC PLL 116 generates the clock signal $F_{PLL}$ to have a controlled phase/frequency relationship with the reference clock signal $F_{REFCLK}$. The clock signal $F_{PLL}$ may be a spread spectrum clock (SSC) clock signal or a non-SSC clock signal based on whether the SSC_EN signal is asserted or deasserted, respectively. The Tx driver 114 may be configured to amplify, voltage level shift, and/or differentialize the transmit data signal $D_{TX}$ to generate a transmit differential data signal Tx+/Tx− for transmission to the second device 130 via the channel 120.

The second device 130 includes a variable gain amplifier (VGA) 132, a receiver (Rx) equalizer (EQ), a Rx latch 136, and a clock and data recovery (CDR) circuit 138. The VGA 132 is configured to amplify a received differential data signal Rx+/Rx− to generate a received amplified signal $V_{RXA}$. The received differential data signal Rx+/Rx− may be the transmit differential data signal Tx+/Tx− after it has propagated to the second device 130 via the channel 120. The Rx EQ 134 is configured to apply equalization to the received amplified signal $V_{RXA}$ to generate a received equalized signal $V_{RXE}$ that is compensated for frequency losses due to the channel 120. The CDR circuit 138 is configured to generate a clock signal $F_{CDR}$ based on the received equalized signal $V_{RXE}$. The Rx latch 136 is configured to generate an output data signal $D_{OUT}$ by sampling/slicing the received equalized signal $V_{RXE}$ based on the clock signal $F_{CDR}$.

Figure 2A:
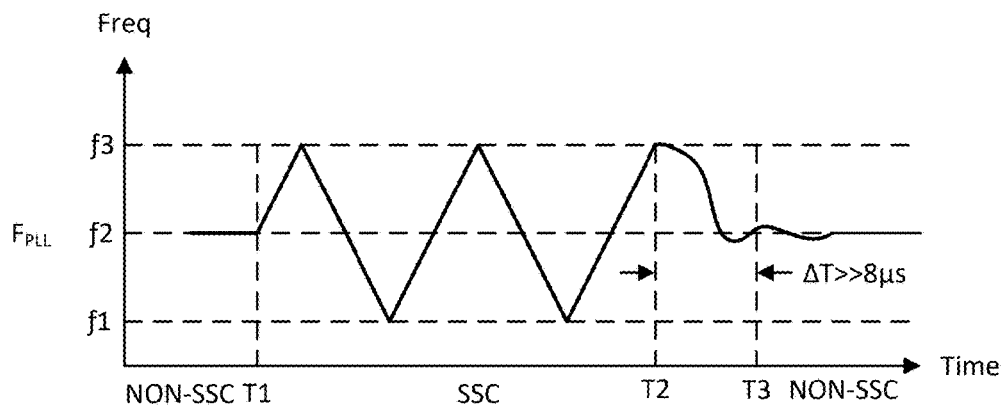
FIG. 2A illustrates a time-based graph of an example phase locked loop (PLL) spread spectrum clock (SSC) signal in accordance with another aspect of the disclosure.

FIG. 2A illustrates a frequency versus time graph of the example clock signal $F_{PLL}$ generated by the Tx SSC PLL 116 in accordance with another aspect of the disclosure. The vertical axis of the graph represents the frequency of the clock signal $F_{PLL}$, including three representative frequencies f1, f2, and f3 (denoted by horizontal dashed lines, respectively). The horizontal axis of the graph represents time including four representative time intervals <T1, T1-T2, T2-T3, and >T3 (separated by vertical dashed lines, respectively).

According to this example, prior to time T1, the SSC_EN signal is deasserted. Based on the SSC_EN signal being deasserted, the Tx SSC PLL 116 generates the clock signal $F_{PLL}$ at substantially a constant frequency f2 (e.g., a non-SSC clock signal). During time interval T1-T2, the SSC_EN signal is asserted. Based on the SSC_EN signal being asserted, the Tx SSC PLL 116 generates the clock signal $F_{PLL}$ so that it swings between a minimum frequency f1 and a maximum frequency f3, for example, in a substantially triangular or other waveform manner (e.g., an SSC clock signal). The frequency f2 may lie between the minimum frequency f1 and the maximum frequency f3 (e.g., substantially halfway between frequencies f1 and f3).

At time T2, the SSC_EN signal becomes deasserted again. In response to the SSC_EN signal becoming deasserted, the Tx SSC PLL 116 transitions the clock signal $F_{PLL}$ to the substantially constant frequency f2 (e.g., the non-SSC clock signal). Based on the loop configuration of the Tx SSC PLL 116, the clock signal $F_{PLL}$ may take a significant time interval ΔT to settle to substantially the constant frequency f2 (e.g., ΔT=T3−T2). In this example, the settling time interval ΔT may be greater than eight (8) microseconds (μs). In some applications, it may be desirable to shorten the settling time interval ΔT (e.g., to less than 8 μs). However, the current loop configuration of the Tx SSC PLL 116 may be set for improved performance with regard to minimizing clock jitter; and as a consequence, may not be able to achieve the settling time interval ΔT of less than 8 μs. As further shown, after the clock signal $F_{PLL}$ settles to substantially the constant frequency f2 at time T3, the clock signal $F_{PLL}$ is said to be a non-SSC clock signal.

Figure 2B:
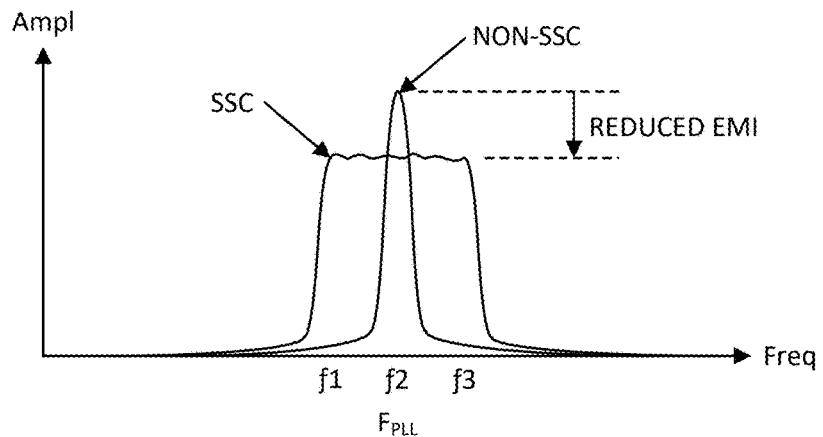
FIG. 2B illustrates a frequency spectrum graph of the example phase locked loop (PLL) spread spectrum clock (SSC) signal of FIG. 2A in accordance with another aspect of the disclosure.

FIG. 2B illustrates a frequency spectrum graph of the example clock signal $F_{PLL}$ generated by the Tx SSC PLL 116 in accordance with another aspect of the disclosure. The vertical axis represents amplitude of the frequency components of the clock signal $F_{PLL}$. The horizontal axis represents frequency including the three representative frequencies f1, f2, and f3.

According to this example, when the Tx SSC PLL 116 is operated in non-SSC mode, the clock signal $F_{PLL}$ has a relatively high amplitude frequency component located narrowly around the substantially constant frequency f2. In certain applications, the high frequency component of the clock signal $F_{PLL}$ may not be desirable as it causes the transmit differential data signal Tx+/Tx− to emit significant amount of electromagnetic interference (EMI) as it propagates via the channel 120. For instance, certain regulatory bodies may place restrictions in the amount of EMI that a device may put out. Additionally, the high EMI may interfere with the operation of components proximate the channel 120 (e.g., components on a printed circuit board (PCB) where the channel is implemented as metallization traces on the PCB).

To reduce the EMI generated, the Tx SSC PLL 116 may be operated in SSC mode as discussed above. In SSC mode, the clock signal $F_{PLL}$ has lower amplitude frequency components spread across a wider frequency range, namely across the minimum and maximum frequencies f1 and f3 between which the clock signal $F_{PLL}$ swings. The lower amplitude frequency components of the clock signal $F_{PLL}$ causes the transmit differential data signal Tx+/Tx− to emit smaller amounts of EMI to meet regulatory restrictions and/or reduce EMI to components proximate the channel 120.

Figure 3A:
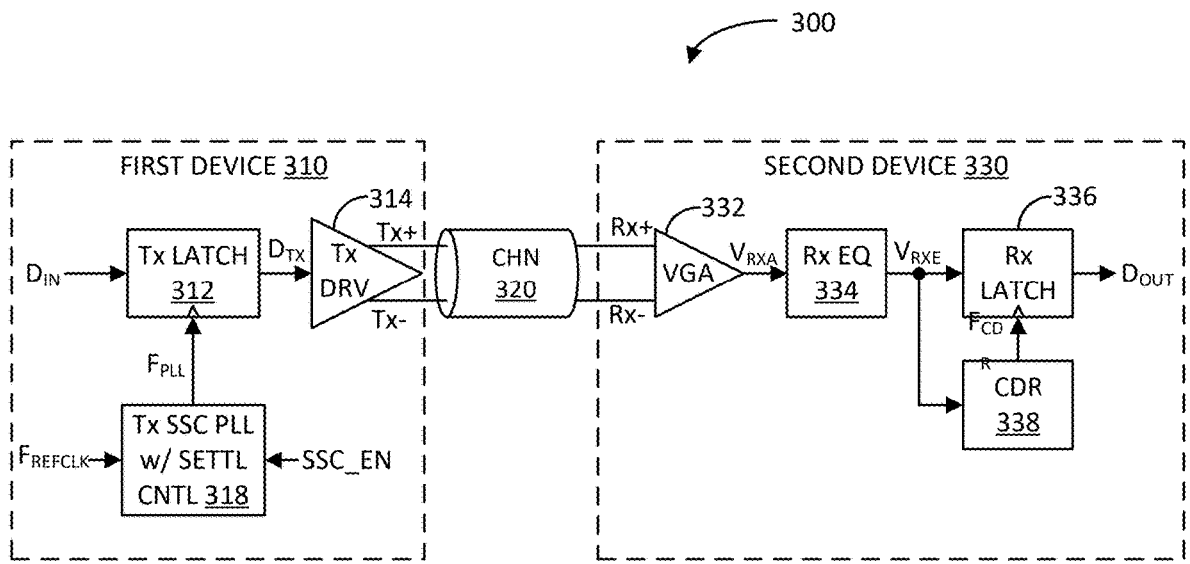
FIG. 3A illustrates a block diagram of another example data communication system in accordance with another aspect of the disclosure.

FIG. 3A illustrates a block diagram of another example data communication system 300 in accordance with another aspect of the disclosure. The data communication system 300 is similar to data communication system 100 and includes many similar components as denoted with the same reference numbers except the most significant digit is a "3" in data communication system 300 instead of a "1" in data communication system 100.

As discussed in more detail further herein, the data communication system 300 differs from data communication system 100 in that the first device 310 includes a transmit spread spectrum clock phase locked loop (Tx SSC PLL) 318 that changes its loop configuration in response to the SSC_EN signal becoming deasserted so as to reduce a time interval ΔT for which the clock signal $F_{PLL}$ settles substantially at the constant frequency f2 pursuant to non-SSC operation. As mentioned above, in certain applications, it may be desirable to shorten the settling time interval ΔT based on regulatory requirements and/or other factors.

Figure 3B:
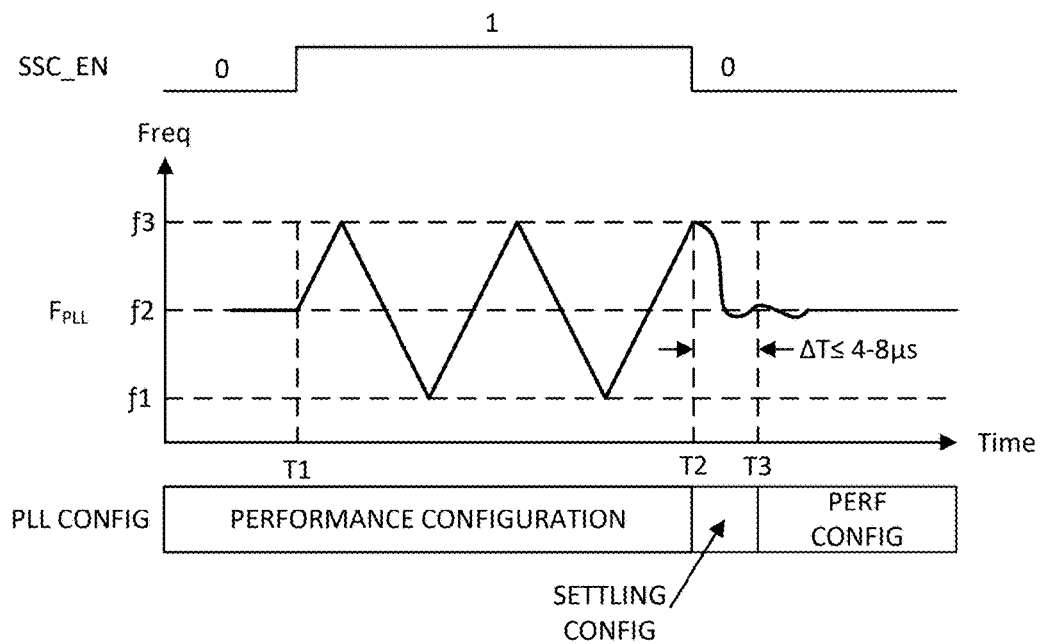
FIG. 3B illustrates a time-based graph of an example spread spectrum clock enable signal (SSC_EN), phase locked loop (PLL) spread spectrum clock (SSC) signal $F_{PLL}$, and PLL settling configuration associated with the data communication system of FIG. 3B in accordance with another aspect of the disclosure.

FIG. 3B illustrates a time-based diagram of example SSC_EN enable signal, the clock signal $F_{PLL}$, and the loop configuration of the Tx SSC PLL 318 in accordance with another aspect of the disclosure. From top to bottom, the diagram depicts a timing diagram of the SSC_EN signal, a frequency versus time graph of the clock signal $F_{PLL}$ (similar to the frequency versus time graph of FIG. 2A), and a timing diagram of the loop configurations of the Tx SSC PLL 318.

According to this example, prior to time T1, the SSC_EN signal is deasserted (e.g., a logic zero (0)). Based on the SSC_EN signal being deasserted, the Tx SSC PLL 318 generates the clock signal $F_{PLL}$ at substantially a constant frequency f2 (e.g., a non-SSC clock signal). At such time, the Tx SSC PLL 318 may be in a performance configuration for reduced clock jitter purposes.

During time interval T1-T2, the SSC_EN signal is asserted (e.g., a logic one (1)). Based on the SSC_EN signal being asserted, the Tx SSC PLL 318 generates the clock signal $F_{PLL}$ so that it swings between a minimum frequency f1 and a maximum frequency f3, for example, in a substantially triangular or other waveform manner (e.g., an SSC clock signal). As discussed, the frequency f2 may lie substantially halfway between the minimum frequency f1 and the maximum frequency f3. During such time interval T1-T2, the Tx SSC PLL 318 may continue to be operated in the performance configuration for reduced clock jitter purposes.

At time T2, the SSC_EN signal becomes deasserted again. In response, the Tx SSC PLL 318 effectuates a loop configuration change to transition and cause a fast settling of the clock signal $F_{PLL}$ to substantially the constant frequency f2 (e.g., the non-SSC clock signal). This is done to reduce the time interval ΔT (e.g., 4-8 μs or less) for the clock signal $F_{PLL}$ to settle to substantially the constant frequency f2. Once the clock signal $F_{PLL}$ has settled to substantially the constant frequency f2 at time T3, the Tx SSC PLL 318 reverts back to the performance loop configuration for reduced clock jitter purposes.

Thus, the Tx SSC PLL 318 operates in the settling loop configuration in response to the SSC_EN signal becoming deasserted in order to reduce the time interval ΔT for which the clock signal $F_{PLL}$ settles at substantially the constant frequency f2. And outside of that time interval ΔT, the Tx SSC PLL 318 may operate in the performance loop configuration for reduced clock jitter purposes.

Figure 4:
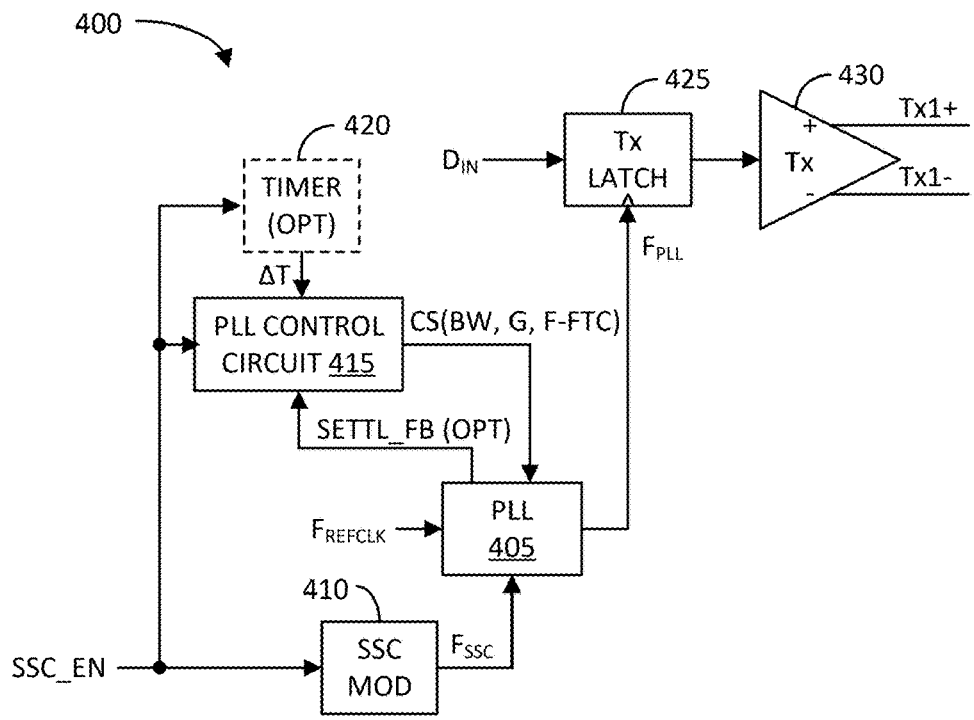
FIG. 4 illustrates a block diagram of an example data transmitter in accordance with another aspect of the disclosure.

FIG. 4 illustrates a block diagram of an example data transmitter 400 in accordance with another aspect of the disclosure. The data transmitter 400 may be an example detailed implementation of the first device 310 previously discussed. The data transmitter 400 includes a phase locked loop (PLL) 405, a spread spectrum clock (SSC) modulator 410, a PLL control circuit 415, an optional timer 420, a transmit (Tx) latch 425, and a transmit (Tx) driver 430. The Tx latch 425 and Tx driver 430 are similar to Tx latches 112/312 and Tx drivers 114/314 previously discussed.

The SSC modulator 410 is configured to generate an SSC modulation signal $F_{SSC}$ based on whether a spread spectrum clock enable (SSC_EN) signal is asserted or deasserted. If the SSC_EN signal is asserted, the SSC modulator 410 generates the SSC modulation signal $F_{SSC}$ as a substantially triangular wave or other waveform manner. If the SSC_EN signal is deasserted, the SSC modulator 410 generates the signal $F_{SSC}$ as a substantially constant signal (e.g., no modulation). As discussed further herein, the SSC modulation signal $F_{SSC}$ may modulate a frequency divider or other component of the PLL 405 so that the PLL 405 generates a clock signal $F_{PLL}$ as a SSC clock signal where it swings between two frequencies (e.g., f1 and f3) in a substantially triangular waveform or other waveform manner if the SSC_EN signal is asserted, or generates the clock signal $F_{PLL}$ as a non-SSC clock signal where it has a substantially constant frequency (e.g., f2).

The PLL control circuit 415 is configured to effectuate a loop configuration change of the PLL 405 based on the SSC_EN signal. More specifically, in response to the SSC_EN signal becoming deasserted, the PLL control circuit 415 generates a control signal (CS) to change the loop configuration of the PLL 405 to reduce the time interval for the clock signal $F_{PLL}$ to settle substantially at the second frequency f2 for SSC operation. For example, the loop configuration may include one or more of the following: the loop bandwidth (BW) of the PLL 405, the loop gain (G) of the PLL 405, and a final fine tune code (F-FTC) (e.g., a digital signal) for frequency fine tuning a voltage controlled oscillator (VCO) of the PLL 405, as discussed further herein. To reduce the time interval for the clock signal $F_{PLL}$ to settle to substantially the second frequency f2, the change in the loop configuration may include one or more of the following: increasing the loop BW of the PLL 405, increasing the loop gain of the PLL 405, or setting the final fine tune code (F-FTC) to a value that digitally controls the VCO (e.g., programmable capacitor bank of the VCO) of the PLL 405 to generate clock signal $F_{PLL}$ at substantially the second frequency f2.

Once the clock signal $F_{PLL}$ settles substantially at the second frequency f2, the PLL control circuit 415 may be configured to effectuate another loop configuration change of the PLL 405 to reconfigure the PLL 405 for clock jitter performance purposes. In this regard, the change in the loop configuration may include one or more of the following: decreasing the loop BW of the PLL 405 (e.g., returning the loop BW to the value prior to the previous configuration change), decreasing the loop gain of the PLL 405 (e.g., returning the loop BW to the value prior to the previous configuration change), or setting the final fine tune code (F-FTC) to the value prior to the previous configuration change).

The PLL control circuit 415 may initiate the second loop configuration change based on a signal generated by the optional timer 420 (e.g., which may be separate or part of the PLL control circuit 415). That is, by empirical testing and evaluation, a certain time interval ΔT after the SSC_EN signal becomes deasserted may achieve the settling of the clock signal $F_{PLL}$ to the substantially the constant frequency f2. Such time interval ΔT may be programmed into the timer

420. Alternatively, the settling time interval ΔT may be determined by monitoring a settling feedback signal (SET-TL_FB) from the PLL 405 that substantially tracks the settling of the clock signal $F_{PLL}$.

Figure 5:
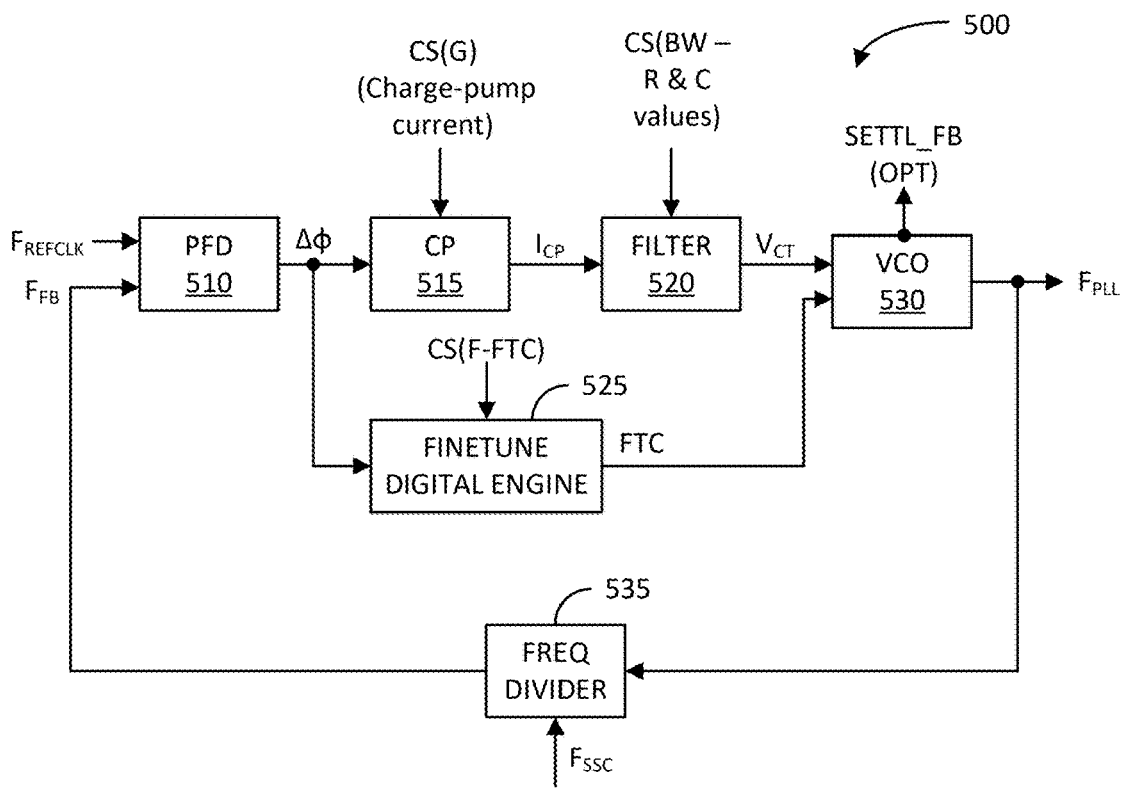
FIG. 5 illustrates a block diagram of an example phase locked loop (PLL) in accordance with another aspect of the disclosure.

FIG. 5 illustrates a block diagram of an example phase locked loop (PLL) 500 in accordance with another aspect of the disclosure. The PLL 500 may be an example implementation of the PLL 405 of data transmitter 400. The PLL 500 includes a phase-frequency detector (PFD) 510, a charge pump (CP) 515, a loop filter 520, a finetune digital engine 525, a voltage controlled oscillator (VCO) 530, and a frequency divider 535.

The PFD 510 is configured to generate a phase error signal Δϕ based on a phase-frequency comparison of a reference clock signal $F_{REFCLK}$ and a loop feedback signal $F_{FB}$. The charge pump 515 is configured to generate a current $I_{CP}$ based on the phase error signal Δϕ. The gain (G) of the charge pump 515 may be given by $I_{CP}/\Delta\phi$. The gain (G) of the charge pump 515 is related to the loop gain of the PLL 500. The filter 520, which may be a low pass filter (LPF) including a resistor (R) and a capacitor (C), is configured to filter the charge pump current $I_{CP}$ to generate a coarse VCO tuning voltage $V_{CT}$ for the VCO 530. The finetune digital engine 525 is configured to generate a fine tune code (FTC) for fine tuning the VCO 530 based on the phase error signal Δϕ. The VCO 530 is configured to generate the clock signal $F_{PLL}$ based on the coarse tuning voltage $V_{CT}$ and the fine tune code (FTC). The frequency divider 535 is configured to frequency divide the clock signal $F_{PLL}$ based on the spread spectrum clock (SSC) modulation signal $F_{SSC}$ to generate the feedback signal $F_{FB}$. As previously discussed, the SSC modulation signal $F_{SSC}$ (e.g., triangular wave) may modulate the divider ratio of the frequency divider 535 to cause the VCO 530 to generate the SSC clock signal $F_{PLL}$.

As previously discussed, the PLL control circuit 415 may cause a loop configuration change to reduce the time interval between the SSC enable signal becoming deasserted and the non-SSC clock signal settling to substantially the second frequency f2. As previously discussed, the loop configuration change may include one or more of the following: increase the loop gain (G), increase the loop bandwidth (BW), or set the final FTC to control the VCO $F_{PLL}$ to generate the clock signal $F_{PLL}$ at substantially the second frequency f2. This may entail the PLL control circuit 415 generating a gain control signal CS(G) to increase the gain ($I_{CP}/\Delta\phi$) of the charge pump 515; generating a control signal CS(BW) to increase the bandwidth (BW) of the filter 520 (e.g., by decreasing a resistance of the resistor R and/or capacitance of the capacitor C of the filter 520), and/or generating a control signal CS(F-FTC) that provides the finetune digital engine 525 the final FTC code associated with the second frequency f2.

The VCO 530 may internally generate the settling feedback (SETTL_FB) signal that tracks the settling of the clock signal $F_{PLL}$ to substantially the second frequency f2. As previously discussed, the PLL control circuit 415 may monitor the settling feedback (SETTL_FB) signal so that it may initiate another loop configuration change to reconfigure the PLL 500 back to the previous configuration (e.g., clock jitter performance configuration). This may entail the PLL control circuit 415 generating the gain control signal CS(G) to decrease the gain ($I_{CP}/\Delta\phi$) of the charge pump 515; generating the control signal CS(BW) to decrease the bandwidth of the filter 520 (e.g., by increasing the resistance of the resistor R and/or capacitance of the capacitor C of the filter 520), and/or allowing the finetune digital engine to produce the FTC in accordance with the phase difference signal Δϕ.

Figure 6:
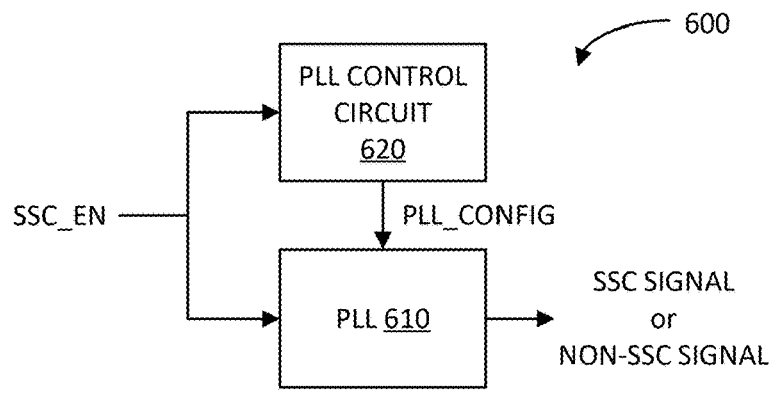
FIG. 6 illustrates a schematic diagram of an example clock signal generator in accordance with another aspect of the disclosure.

FIG. 6 illustrates a schematic diagram of an example clock signal generator 600 in accordance with another aspect of the disclosure. The clock signal generator 600 includes a phase locked loop (PLL) 610 configured to generate a spread spectrum clock (SSC) clock signal where the SSC clock signal swings between a first frequency (f1) and a third frequency (f3) based on an SSC enable signal SSC_EN being asserted, or a non-SSC clock signal where the non-SSC signal is substantially constant at a second frequency (f2) based on the SSC enable signal SSC_EN being deasserted.

The clock signal generator 600 further includes a PLL control circuit 620 configured to effectuate a first configuration change of the PLL 610 in response to the SSC enable signal SSC_EN becoming deasserted, the first configuration change reducing a time interval between the SSC enable signal becoming deasserted and the non-SSC clock signal settling to substantially the second frequency (f2).

Figure 7:
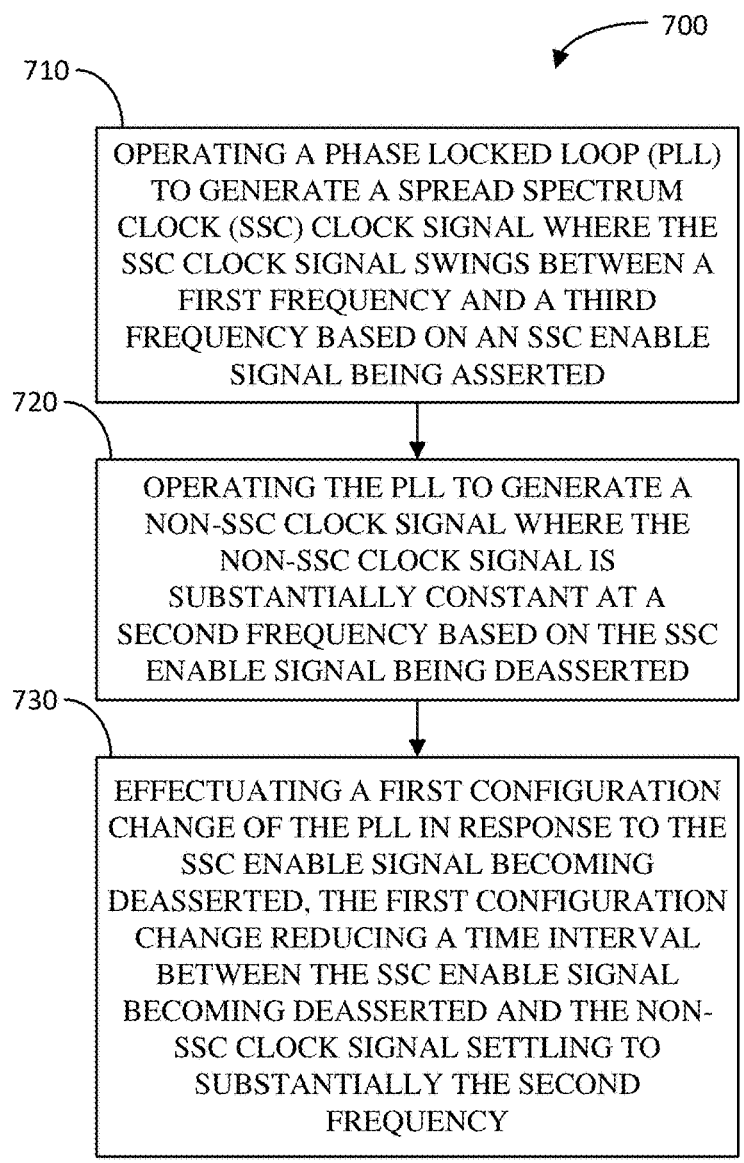
FIG. 7 illustrates a flow diagram of an example method of generating a clock signal in accordance with another aspect of the disclosure.

FIG. 7 illustrates a flow diagram of an example method 700 of generating a clock signal in accordance with another aspect of the disclosure. The method 700 includes operating a phase locked loop (PLL) to generate a spread spectrum clock (SSC) clock signal where the SSC clock signal swings between a first frequency and a third frequency based on an SSC enable signal being asserted (block 710). Examples of means for operating a phase locked loop (PLL) to generate a spread spectrum clock (SSC) clock signal where the SSC clock signal varies between a first frequency and a third frequency based on an SSC enable signal being asserted include any of the PLLs configured to respond, directly or indirectly, to an asserted SSC enable signal described herein.

The method 700 further includes operating the PLL to generate a non-SSC clock signal where the non-SSC clock signal is substantially constant at a second frequency based on the SSC enable signal being deasserted (block 720). Examples of means for operating the PLL to generate a non-SSC clock signal where the non-SSC clock signal is substantially constant at a second frequency based on the SSC enable signal being deasserted include any of the PLLs configured to respond, directly or indirectly, to a deasserted SSC enable signal described herein.

Additionally, the method 700 includes effectuating a first configuration change of the PLL in response to the SSC enable signal becoming deasserted to reduce a time interval for which the non-SSC signal settles substantially at the second frequency after the first configuration change (block 730). Examples of means for effectuating a first configuration change of the PLL in response to the SSC enable signal becoming deasserted, the first configuration change reducing a time interval between the SSC enable signal becoming deasserted and the non-SSC clock signal settling to substantially the second frequency include any of the PLL control circuits described herein.

The following provides an overview of aspects of the present disclosure:

Aspect 1: An apparatus, including: a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; and a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency.

Aspect 2: The apparatus of aspect 1, wherein the first configuration change comprises increasing a loop bandwidth of the PLL.

Aspect 3: The apparatus of aspect 1 or 2, wherein the first configuration change comprises modifying a loop filter of the PLL.

Aspect 4: The apparatus of aspect 3, wherein modifying the loop filter of the PLL comprises decreasing a resistance of a resistor of the loop filter of the PLL.

Aspect 5: The apparatus of aspect 3 or 4, wherein modifying the loop filter of the PLL comprises decreasing a capacitance of a capacitor of the loop filter of the PLL.

Aspect 6: The apparatus of any one of aspects 1-5, wherein the first configuration change comprises increasing a loop gain of the PLL.

Aspect 7: The apparatus of aspect 6, wherein increasing the loop gain comprises increasing a gain of a charge pump of the PLL.

Aspect 8: The apparatus of any one of aspects 1-7, wherein the PLL comprises a voltage controlled oscillator (VCO) configured to generate the SSC signal and the non-SSC signal, wherein the first configuration change comprises setting a digital signal used to tune the VCO to a value associated with the second frequency.

Aspect 9: The apparatus of any one of aspects 1-8, wherein the control circuit is further configured to effectuate a second configuration change of the PLL after the non-SSC clock signal settles substantially at the second frequency.

Aspect 10: The apparatus of aspect 9, further comprising a timer configured to initiate the second configuration change of the PLL based on a defined time interval from the SSC enable signal becoming deasserted.

Aspect 11: The apparatus of aspect 9, wherein the control circuit is configured effectuate the second configuration change of the PLL based on the settling of the non-SSC clock signal.

Aspect 12: A method, comprising: operating a phase locked loop (PLL) to generate a spread spectrum clock (SSC) clock signal where the SSC clock signal swings between a first frequency and a third frequency based on an SSC enable signal being asserted; operating the PLL to generate a non-SSC clock signal where the non-SSC clock signal is substantially constant at a second frequency based on the SSC enable signal being deasserted; and effectuating a first configuration change of the PLL in response to the SSC enable signal becoming deasserted, the first configuration change reducing a time interval between the SSC enable signal becoming deasserted and the non-SSC clock signal settling to substantially the second frequency.

Aspect 13: The method of aspect 12, wherein effectuating the first configuration change comprises increasing a loop bandwidth of the PLL.

Aspect 14: The method of aspect 12 or 13, wherein effectuating the first configuration change comprises modifying a loop filter of the PLL.

Aspect 15: The method of any one of aspects 12-14, wherein effectuating the first configuration change comprises increasing a loop gain of the PLL.

Aspect 16: The method of any one of aspects 12-15, wherein effectuating the first configuration change comprises setting a digital signal used to tune a voltage controlled oscillator (VCO) of the PLL to a value associated with the second frequency.

Aspect 17: The method of any one of aspects 12-16, further comprising effectuating a second configuration change of the PLL in response to the non-SSC clock signal settles substantially at the second frequency.

Aspect 18: An apparatus, comprising: a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency; and a transmit driver configured to generate a data signal with a data rate based on the SSC clock signal or non-SSC clock signal.

Aspect 19: The apparatus of aspect 18, wherein the first configuration change comprises increasing a loop bandwidth of the PLL.

Aspect 20: The apparatus of aspect 18 or 19, wherein the first configuration change comprises increasing a loop gain of the PLL.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted; and
a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency.

2. The apparatus of claim 1, wherein the first configuration change comprises increasing a loop bandwidth of the PLL.

3. The apparatus of claim 1, wherein the first configuration change comprises modifying a loop filter of the PLL.

4. The apparatus of claim 3, wherein modifying the loop filter of the PLL comprises decreasing a resistance of a resistor of the loop filter of the PLL.

5. The apparatus of claim 3, wherein modifying the loop filter of the PLL comprises decreasing a capacitance of a capacitor of the loop filter of the PLL.

6. The apparatus of claim 1, wherein the first configuration change comprises increasing a loop gain of the PLL.

7. The apparatus of claim 6, wherein increasing the loop gain comprises increasing a gain of a charge pump of the PLL.

8. The apparatus of claim 1, wherein the PLL comprises a voltage controlled oscillator (VCO) configured to generate the SSC clock signal and the non-SSC clock signal, wherein the first configuration change comprises setting a digital signal used to tune the VCO to a value associated with the second frequency.

9. The apparatus of claim 1, wherein the control circuit is further configured to effectuate a second configuration change of the PLL after the non-SSC clock signal settles substantially at the second frequency.

10. The apparatus of claim 9, further comprising a timer configured to initiate the second configuration change of the PLL based on a defined time interval from the SSC enable signal becoming deasserted.

11. The apparatus of claim 9, wherein the control circuit is configured effectuate the second configuration change of the PLL based on the settling of the non-SSC clock signal.

12. A method, comprising:
  operating a phase locked loop (PLL) to generate a spread spectrum clock (SSC) clock signal where the SSC clock signal swings between a first frequency and a third frequency based on an SSC enable signal being asserted;
  operating the PLL to generate a non-SSC clock signal where the non-SSC clock signal is substantially constant at a second frequency based on the SSC enable signal being deasserted; and
  effectuating a first configuration change of the PLL in response to the SSC enable signal becoming deasserted, the first configuration change reducing a time interval between the SSC enable signal becoming deasserted and the non-SSC clock signal settling to substantially the second frequency.

13. The method of claim 12, wherein effectuating the first configuration change comprises increasing a loop bandwidth of the PLL.

14. The method of claim 12, wherein effectuating the first configuration change comprises modifying a loop filter of the PLL.

15. The method of claim 12, wherein effectuating the first configuration change comprises increasing a loop gain of the PLL.

16. The method of claim 12, wherein effectuating the first configuration change comprises setting a digital signal used to tune a voltage controlled oscillator (VCO) of the PLL to a value associated with the second frequency.

17. The method of claim 12, further comprising effectuating a second configuration change of the PLL in response to the non-SSC clock signal settles substantially at the second frequency.

18. An apparatus, comprising:
  a phase locked loop (PLL) configured to generate a spread spectrum clock (SSC) clock signal where the SSC clock signal swings between a first frequency and a third frequency based on an SSC enable signal being asserted, or a non-SSC clock signal where the non-SSC clock signal is substantially constant at a second frequency based on the SSC enable signal being deasserted;
  a control circuit configured to effectuate a first configuration change of the PLL in response to the SSC enable signal becoming deasserted, the first configuration change reducing a time interval between the SSC enable signal becoming deasserted and the non-SSC clock signal settling to substantially the second frequency; and
  a transmit driver configured to generate a data signal with a data rate based on the SSC clock signal or non-SSC clock signal.

19. The apparatus of claim 18, wherein the first configuration change comprises increasing a loop bandwidth of the PLL.

20. The apparatus of claim 18, wherein the first configuration change comprises increasing a loop gain of the PLL.

* * * * *